US 6,635,007 B2

(12) United States Patent
Evans, III et al.

(10) Patent No.: US 6,635,007 B2
(45) Date of Patent: Oct. 21, 2003

(54) METHOD AND APPARATUS FOR DETECTING AND CONTROLLING IMBALANCE CONDITIONS IN A CENTRIFUGE SYSTEM

(75) Inventors: Robert R. Evans, III, Framingham, MA (US); Dara McMahon, Natick, MA (US)

(73) Assignee: Thermo IEC, Inc., Needham Heights, MA (US)

( * ) Notice: Subject to any disclaimer, the term of this patent is extended or adjusted under 35 U.S.C. 154(b) by 0 days.

(21) Appl. No.: 09/908,458

(22) Filed: Jul. 17, 2001

(65) Prior Publication Data

US 2002/0077239 A1 Jun. 20, 2002

Related U.S. Application Data

(60) Provisional application No. 60/218,743, filed on Jul. 17, 2000.

(51) Int. Cl.$^7$ ................................................. B04B 13/00
(52) U.S. Cl. ............................... 494/7; 494/10; 494/82; 73/462
(58) Field of Search ............................. 494/1, 7, 9, 10, 494/11, 12, 16, 20, 37, 82, 84; 210/85, 144; 318/460, 470; 74/574; 324/162; 73/66, 457, 460, 462; 68/23.1, 233, 12.06

(56) References Cited

U.S. PATENT DOCUMENTS

| 2,895,023 | A | * | 7/1959 | Blum |
| 3,101,322 | A | * | 8/1963 | Stallman et al. |
| 3,248,046 | A | | 4/1966 | Feltman, Jr. et al. |
| 3,788,162 | A | | 1/1974 | Rabenhorst et al. |
| 3,815,618 | A | | 6/1974 | Joyce |
| 3,834,613 | A | | 9/1974 | Hankey |
| 3,840,040 | A | | 10/1974 | Joyce |
| 3,845,371 | A | | 10/1974 | Grinnell, Jr. |
| 3,858,795 | A | | 1/1975 | Joyce |
| 3,861,294 | A | | 1/1975 | Coldren |
| 3,912,452 | A | | 10/1975 | Sodickson et al. |
| 3,913,828 | A | | 10/1975 | Roy |
| 3,937,614 | A | | 2/1976 | Sodickson et al. |
| 3,938,354 | A | | 2/1976 | Lehman |
| 4,059,405 | A | | 11/1977 | Sodickson et al. |
| 4,096,988 | A | * | 6/1978 | Scuricini |
| 4,099,667 | A | * | 7/1978 | Uchida |
| 4,102,490 | A | | 7/1978 | Chulay |
| 4,178,153 | A | | 12/1979 | Sodickson |
| 4,201,066 | A | | 5/1980 | Nolan, Jr. |
| 4,207,778 | A | | 6/1980 | Hatch |
| 4,214,179 | A | * | 7/1980 | Jacobson et al. |
| 4,266,442 | A | | 5/1981 | Zorzi |
| 4,298,345 | A | | 11/1981 | Sodickson et al. |
| 4,413,860 | A | | 11/1983 | Prescott |

(List continued on next page.)

FOREIGN PATENT DOCUMENTS

| CA | 969780 | 6/1975 |
| CA | 1000959 | 12/1976 |
| CA | 1026583 | 2/1978 |
| CA | 1049386 | 2/1979 |
| CA | 1166939 | 5/1984 |
| DE | 21 59 868 | 7/1973 |
| EP | 0 138 383 B1 | 2/1990 |
| GB | 2 146 784 | 7/1986 |

Primary Examiner—Charles E. Cooley
(74) Attorney, Agent, or Firm—Wolf, Greenfield, Sacks, P.C.

(57) ABSTRACT

A method and apparatus for controlling a centrifuge system, the centrifuge system including a rotor and a motor operatively coupled to the rotor, the apparatus including an accelerometer coupled to the centrifuge system so as to measure an acceleration of at least a portion of the centrifuge system during operation of the centrifuge system to provide an acceleration signal, a filter that receives the acceleration signal and provides a filtered acceleration signal, and a controller that receives the displacement signal and controls the centrifuge system in response to the displacement signal.

33 Claims, 9 Drawing Sheets

U.S. PATENT DOCUMENTS

| | | | |
|---|---|---|---|
| 4,059,405 A | | 2/1984 | Sodickson et al. |
| 4,468,269 A | | 8/1984 | Carey |
| 4,491,019 A | * | 1/1985 | Wicki et al. |
| 4,551,715 A | | 11/1985 | Durbin |
| 4,601,696 A | | 7/1986 | Kamm |
| 4,700,117 A | * | 10/1987 | Giebeler et al. |
| 4,701,157 A | | 10/1987 | Potter |
| 4,738,656 A | | 4/1988 | Piramoon et al. |
| 4,781,669 A | | 11/1988 | Piramoon |
| 4,790,808 A | | 12/1988 | Piramoon |
| 4,817,453 A | | 4/1989 | Breslich, Jr. et al. |
| 4,824,429 A | | 4/1989 | Keunen et al. |
| 4,827,197 A | * | 5/1989 | Giebeler |
| 4,860,610 A | | 8/1989 | Popper et al. |
| 4,910,502 A | * | 3/1990 | Serveau et al. |
| 4,972,110 A | * | 11/1990 | Gorodissky et al. |
| 4,991,462 A | | 2/1991 | Breslich, Jr. et al. |
| 5,057,071 A | | 10/1991 | Piramoon |
| 5,160,876 A | * | 11/1992 | Niinai et al. |
| 5,225,165 A | | 7/1993 | Perlman |
| 5,235,864 A | | 8/1993 | Rosselli et al. |
| 5,291,783 A | | 3/1994 | Hall |
| 5,338,283 A | | 8/1994 | Fleming et al. |
| 5,362,301 A | | 11/1994 | Malekmadani et al. |
| 5,382,218 A | | 1/1995 | Uchida |
| 5,383,838 A | | 1/1995 | Cheng et al. |
| 5,496,254 A | * | 3/1996 | Keller et al. |
| 5,509,881 A | | 4/1996 | Sharples |
| 5,518,493 A | | 5/1996 | Srinivasan |
| 5,688,103 A | * | 11/1997 | Tsuji et al. |
| 5,736,054 A | | 4/1998 | Feller et al. |
| 5,738,622 A | * | 4/1998 | Niinai et al. |
| 5,800,331 A | * | 9/1998 | Song |
| 5,809,843 A | * | 9/1998 | Barger et al. |
| 5,919,123 A | * | 7/1999 | Phillips |
| 5,921,148 A | * | 7/1999 | Howell |
| 6,276,213 B1 | * | 8/2001 | Lee, Jr. et al. |
| 6,350,224 B1 | | 2/2002 | Cordaro et al. |
| 6,392,741 B1 | * | 5/2002 | Mori et al. |
| 2001/0035068 A1 | * | 11/2001 | Case et al. |

* cited by examiner

METHOD AND APPARATUS FOR DETECTING AND CONTROLLING IMBALANCE CONDITIONS IN A CENTRIFUGE SYSTEM

CROSS REFERENCE TO RELATED APPLICATIONS

This application claims the benefit of U.S. Provisional Application Serial No. 60/218,743 entitled ACCELEROMETER BASED IMBALANCE DETECTION, filed Jul. 17, 2000; which application is hereby incorporated herein by reference.

BACKGROUND OF THE INVENTION

1. Field of the Invention

The present invention relates generally to the field of centrifuge systems. More particularly, the present invention relates to detecting and controlling imbalance conditions in a centrifuge system.

2. Discussion of the Related Art

Rotors for centrifuge systems are typically well balanced and run smoothly across the speed range through which they are rotated. The addition of samples to the rotor creates the potential situation for the rotor to be out of balance. This causes unwanted motion in the motor and the mounting system as the mechanical system (including the motor, rotor, and mounting system) rotates about the new center of gravity determined by the size and position of the imbalance. The response of this mechanical system will exhibit resonant peaks due to the flexibility and mass of the motor, the mounting system, and the cabinet. Thus, as the motor is brought up to speed, the vibrations caused by the imbalance will result in a displacement of the motor and the mounting system. As the motor is brought up to speed, the resonant peaks will induce peaks in the amplitude of the motor motion. The amplitudes of these displacements are limited by the fact that the physical structure of the machine gets in the way and the motor/rotor/mounting system may come into contact with the structure of the machine. In particular, the rotor should not be allowed to hit other parts of the centrifuge system in order to avoid damage or destruction.

Further consequences of operating the centrifuge system when there is an imbalance in the motor/rotor/mounting system may be increased noise, possible sample resuspension (especially at acceleration/deceleration as the speed moves through the resonant peaks), and excessive vibration and machine movement.

Two conventional approaches to measuring the motion of the motor/rotor/mount system due to the out of balance condition are:

1. A mechanical arm is positioned such that when the motion becomes large enough, the arm trips a switch, and this switch closure is detected by the control system and appropriate action is taken, such as shutting the system down.
2. A magnetic switch, consisting of a small permanent magnet and Hall effect sensor is used to perform the same function as the mechanical arm. In this case, the magnet is positioned above the sensor, linked to the motor/rotor/mount system. When the motor position moves sufficiently to bring the magnet closer to the Hall effect sensor, the increased magnetic field trips the sensor and this is detected by the control system to take appropriate action, such as shutting the system down.

Both of these systems are typically manually adjusted during manufacture to work reliably, i.e. within the range of imbalance that has been determined to match the particular machine design.

SUMMARY OF THE INVENTION

The present invention provides an apparatus for controlling a centrifuge system, the centrifuge system including a rotor and a motor operatively coupled to the rotor, the apparatus comprising an accelerometer coupled to the centrifuge system so as to measure an acceleration of at least a portion of the centrifuge system during operation of the centrifuge system to provide an acceleration signal, and a controller that receives the acceleration signal and controls the centrifuge in response to the acceleration signal.

According to an embodiment of the invention, the controller compares the acceleration signal with a reference signal and provides a control signal when a magnitude of the acceleration signal is larger than the magnitude of the reference signal.

According to an embodiment of the invention, the centrifuge system is shut down in response to the control signal.

According to an embodiment of the invention, the rotational speed of the rotor is reduced in response to the control signal.

According to an embodiment of the invention, the acceleration signal is a voltage.

According to an embodiment of the invention, the acceleration signal is a current.

According to an embodiment of the invention, the acceleration is in a radial direction.

According to an embodiment of the invention, the acceleration is in a longitudinal direction.

According to an embodiment of the invention, the acceleration is in a direction generally perpendicular to an axis of rotation of the rotor.

According to an embodiment of the invention, the acceleration is in a direction generally perpendicular to an axis of rotation of the motor.

According to an embodiment of the invention, the acceleration is the result of an imbalance condition in the rotor.

According to an embodiment of the invention, the accelerometer is an integrated circuit.

According to an embodiment of the invention, the accelerometer is a monolithic integrated circuit.

According to an embodiment of the invention, the acceleration is caused by vibrations of the rotor having a range of frequencies when the rotor is spinning and wherein the apparatus further comprises means for determining a range of frequencies that the accelerometer will sense.

According to an embodiment of the invention, the apparatus further comprises a filter that receives the acceleration signal from the accelerometer and provides a filtered acceleration signal to the controller.

According to an embodiment of the invention, the filter comprises a high-pass filter.

According to an embodiment of the invention, the filter comprises a bandpass filter.

According to an embodiment of the invention, the filter comprises a low-pass filter.

According to an embodiment of the invention, the low-pass filter comprises an integrator that receives the acceleration signal and integrates the acceleration signal to provide a displacement signal that represents a displacement of at least one of the motor and the rotor of the centrifuge system and wherein the controller receives the displacement signal and controls the centrifuge system in response to the displacement signal.

According to an embodiment of the invention, the integrator integrates the acceleration signal to provide a velocity signal and then integrates the velocity signal to provide the displacement signal.

According to an embodiment of the invention, the integrator includes an operational amplifier and a capacitor.

According to an embodiment of the invention, the displacement signal is a voltage.

According to an embodiment of the invention, the displacement signal is a current.

According to an embodiment, the invention includes a method of controlling a centrifuge system, the centrifuge system including a rotor and a motor operatively coupled to the rotor, the method comprising the steps of measuring an acceleration of at least a portion of the centrifuge system during operation of the centrifuge system to provide an acceleration signal and controlling the centrifuge system in response to the displacement signal.

According to an embodiment of the invention, the step of controlling the centrifuge system further comprises comparing the acceleration signal with a reference signal and providing a control signal when a magnitude of the acceleration signal is larger than a magnitude of the reference signal.

According to an embodiment of the invention, the control signal shuts off the centrifuge system.

According to an embodiment of the invention, the centrifuge system responds to the control signal to reduce a rotational speed of the rotor.

According to an embodiment of the invention, the step of determining a range of frequencies includes filtering the range of frequencies to provide a filtered acceleration signal.

According to an embodiment of the invention, the step of filtering the range of frequencies includes high-pass filtering the range of frequencies.

According to an embodiment of the invention, the step of filtering the range of frequencies including band-pass filtering the range of frequencies.

According to an embodiment of the invention, the step of filtering the range of frequencies includes low-pass filtering the range of frequencies.

According to an embodiment of the invention, the step of low-pass filtering further comprises the step of integrating the acceleration signal to provide a displacement signal that represents a displacement of at least one of the motor and the rotor of the centrifuge system and wherein the step of controlling the centrifuge system includes controlling the centrifuge system in response to the displacement signal.

According to an embodiment of the invention, the step of integrating further includes integrating the acceleration signal to provide a velocity signal and then integrating the velocity signal to provide the displacement signal.

According to an embodiment of the invention, the acceleration is caused by vibrations of the rotor having a range of frequencies and wherein the method further comprises the step of determining a range of frequencies that will be sensed when measuring the acceleration.

The features and advantages of the present invention will be more readily understood and apparent from the following detailed description of the invention, which should be read in conjunction with the accompanying drawings, and from the claims which are appended at the end of the Detailed Description.

BRIEF DESCRIPTION OF THE DRAWINGS

In the drawings, which are incorporated herein by reference and in which like elements have been given like reference characters.

DETAILED DESCRIPTION

Figure 1:
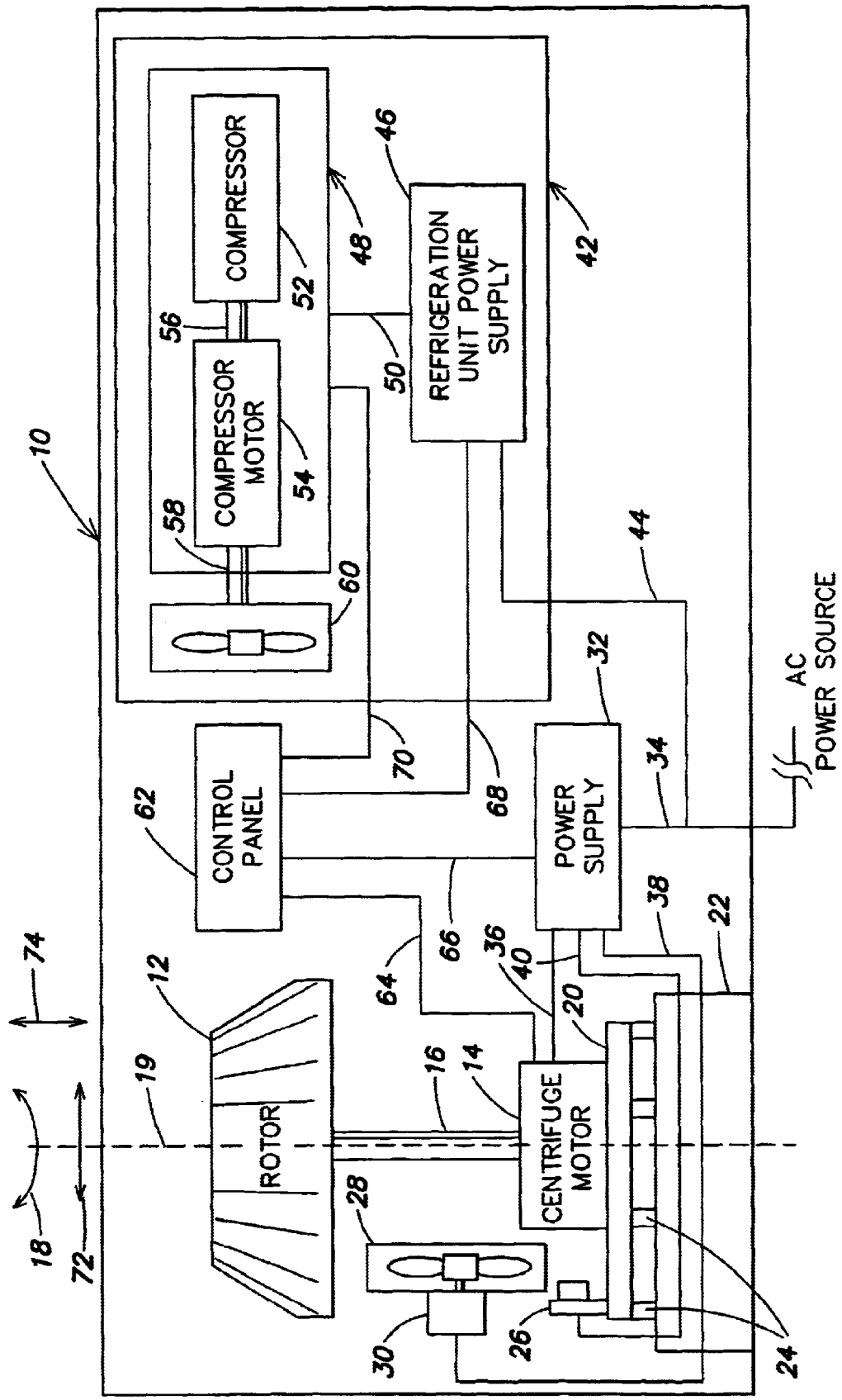
FIG. 1 is a schematic block diagram of a centrifuge system according to the invention.

Reference is now made to FIG. 1, which figure illustrates a centrifuge system according to the present invention. Centrifuge system 10 includes a rotor 12 that is designed to hold one or more samples to be centrifuged. The rotor 12 is coupled to a centrifuge motor 14 via a shaft 16. As illustrated in FIG. 1, rotor 12, motor 14, and shaft 16 are directly connected together. One skilled in the art will appreciate that alternatively, centrifuge motor 14 may be connected to rotor 12 through some other means, such as through a gear system, a chain drive system, or a belt drive system. Rotor 12 spins about an axis of rotation 19.

Centrifuge motor 14 is mounted to a mounting system that includes base plate 20, base 22, and isolation or shock mounts 24. Shock mounts 24 may be, for example, rubber bushings. An imbalance detection system 26 is mounted to base plate 20. A cooling fan 28 and fan motor 30 are provided to cool centrifuge motor 14 during operation of centrifuge system 10.

A power supply 32 receives power from an AC power source over connection 34 and supplies appropriate power to centrifuge motor 14 via connections 36. Power supply 32 also supplies appropriate power and control signals to fan motor 30 over connection 38. Power supply 32 sends power to and receives control signals from imbalance detection system 26 over connection 40.

Centrifuge system 10 may optionally be provided with a refrigeration unit 42. Refrigeration unit 42 is used to maintain the rotor and the samples contained therein that are being centrifuged at a desired temperature. Refrigeration unit 42 receives power from the AC power source via connection 44 which supplies power to the refrigeration unit power supply 46. The refrigeration unit power supply 46 provides appropriate power and control signals to compressor unit 48 via connection 50. Compressor unit 48 includes a compressor 52 operatively coupled to compressor motor 54 via shaft 56. Compressor motor 54 has an additional shaft 58 which operates cooling fan 60.

A control panel 62 is coupled to centrifuge motor 14, power supply 32, refrigeration unit power supply 46, and compressor unit 48 via respective connections 64, 66, 68, and 70. Control panel 62 may include a display and allows an operator to control operation of centrifuge system 10, such as to select speed of rotation, duration, etc.

During operation of centrifuge system 10, rotor 12, driven by centrifuge motor 14, rotates about axis of rotation 19 in directions defined by double-headed arrow 18. If an imbalance condition exists, due, for example, to unbalanced sample placement in rotor 12, a new center of gravity will be established in the rotor/motor/mounting system. As the rotor rotates about this new center of gravity, vibrations in the system are induced. These vibrations translate into acceleration. The acceleration may be directed along the direction of double-headed arrow 72, which direction is generally perpendicular to axis of rotation 19. This type of acceleration may be referred to as radial type acceleration. Alternatively, the acceleration forces may be generated along the direction of double-headed arrow 74. Acceleration that is generated along the direction of double-headed arrow 74 may be referred to as longitudinal acceleration. There are also cases where the acceleration has components in the direction of both double-headed arrow 72 and double-headed arrow 74 and thus the acceleration may be radial and longitudinal at the same time. If the acceleration exceeds the tolerances of centrifuge system 10, then rotor 12 may come in contact with a stationary part of centrifuge system 10. This can result in severe damage or even destruction of the centrifuge system.

Figure 2:
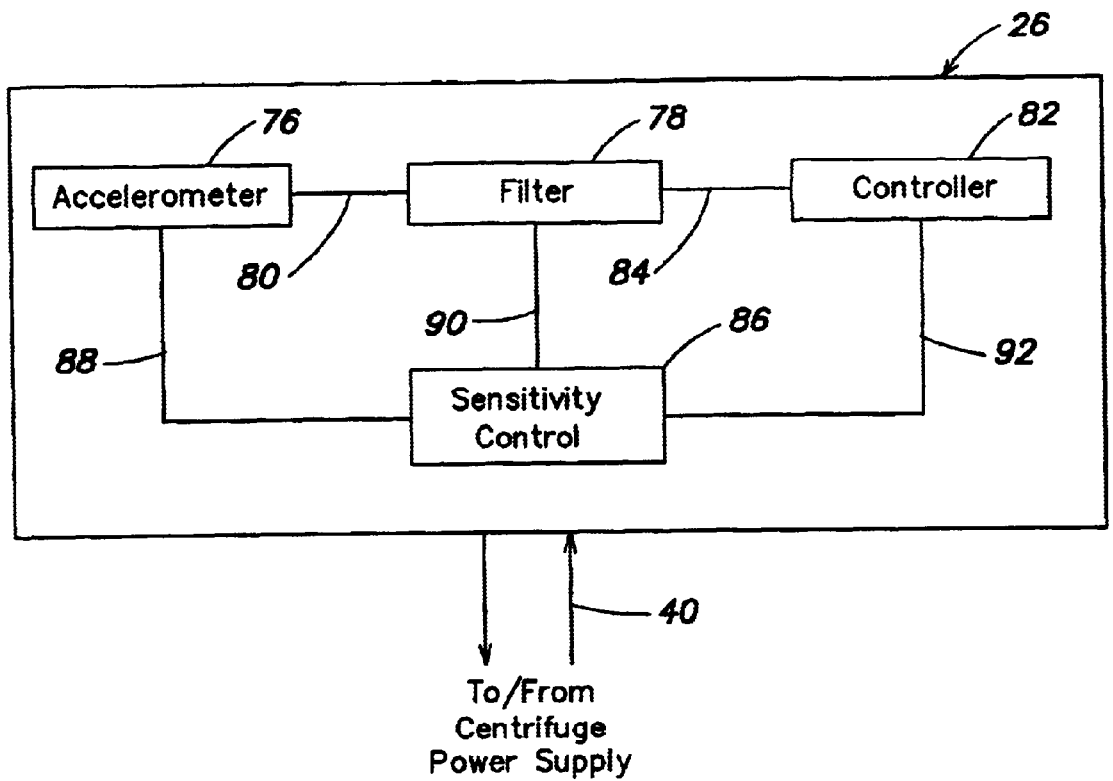
FIG. 2 is a schematic block diagram of an imbalance detection system that may be used in the centrifuge system of FIG. 1.

FIG. 2 illustrates an imbalance detection system that may be used in the centrifuge system of FIG. 1 to control operation of the centrifuge system during imbalance conditions. Imbalance detection 26 receives power from and sends signals to centrifuge power supply 32 via connections 40. Imbalance detection system 26 includes an accelerometer 76 that provides an acceleration signal to filter 78, that may also be provided in the imbalance detection system, via connection 80. Filter 78 provides a filter/conditioned acceleration signal to controller 82 via connection 84.

Accelerometer 76 may be an integrated circuit accelerometer such as the ADCXL series from Analog Devices, Inc. In one embodiment of the invention, accelerometer 76 is an ADXL150 manufactured by Analog Devices, Inc. Other types of integrated circuit accelerometers may also be used, including monolithic integrated circuit accelerometers.

Accelerometer 76 senses the acceleration caused by the vibrations induced in rotor 12/centrifuge motor 14/base 20 because it is mounted to base 20. This acceleration signal is provided to filter 78.

Filter 78 filters or conditions the acceleration signal provided to controller 82 so as to provide a filtered acceleration signal. Filter 78 may be a low-pass filter, a high-pass filter, a bandpass filter, or some combination thereof depending upon what frequencies in the acceleration signal are desired to be detected for purposes of sensing imbalance conditions. In one embodiment that will be discussed in greater detail hereinafter, filter 78 may be an integrator which provides a low-pass type filtering function so that controller 82 will respond to the magnitude of the acceleration signal over some time period instead of instantaneously, because instantaneous response might cause, for example, undesirable on/off cycling of the centrifuge motor.

Figure 3:
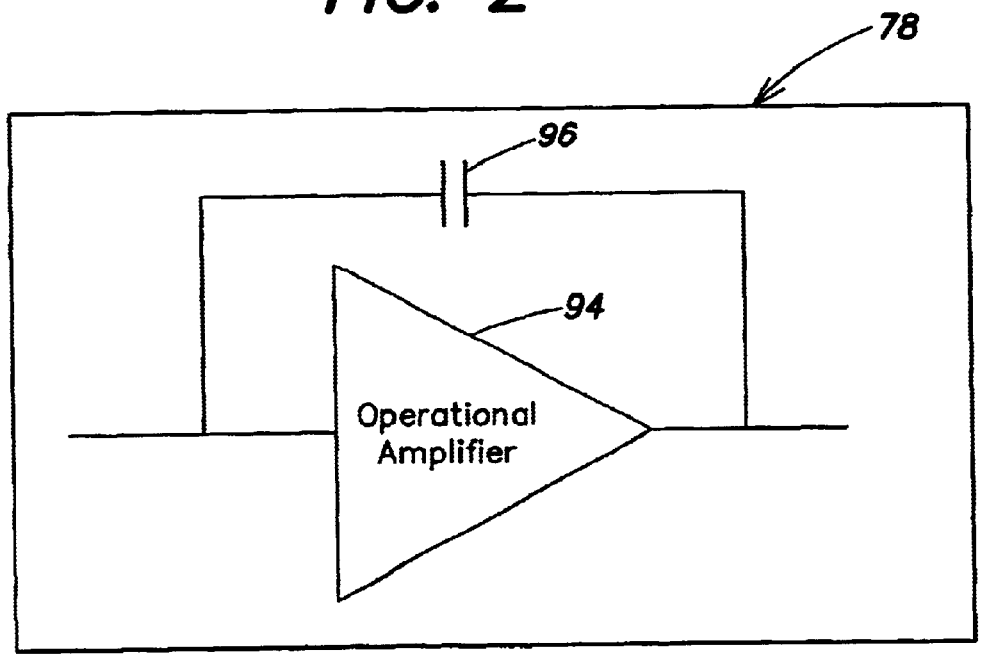
FIG. 3 is a schematic block diagram of an integrator that may be used in the imbalance detection system of FIG. 2.

FIG. 3 illustrates a more detailed implementation of filter 78. In FIG. 3, filter 78 is an integrator comprised of an operational amplifier 94 and a capacitor 96. As will be explained in detail hereinafter, multiple stages of integration may be provided and therefore several of the integrators illustrated in FIG. 3 may be connected in series.

The velocity of an object is the first derivative of displacement (change in position per change in time) and acceleration is the first derivative of velocity (change in speed per change in time). Thus, displacement of the rotor/motor/mount system is the second integral of acceleration. Integrator 78 integrates the acceleration signal provided by accelerometer 76 to provide a signal that is indicative of the displacement of the motor/rotor/mounting system. The acceleration signal provided by accelerometer 76 may be a voltage or a current. In the same manner, the displacement signal provided by integrator 78 may be a voltage or a current. Integrator 78 thus, in one embodiment of the invention, performs two integrations; a first one integrating the acceleration signal to provide a velocity signal and a second integration to integrate the velocity signal to provide a displacement signal. The displacement signal provided by integrator 78 is sent to controller 82.

Controller 82 compares the displacement signal provided by filter 78 with a reference signal. If the magnitude of the displacement signal exceeds the magnitude of the reference signal, then the movement of the motor/rotor/mounting system has exceeded the tolerance of the system and controller 82 issues a control signal to centrifuge motor 14 via power supply 32. Controller 82 may take one of a number of actions. Controller 82 may direct centrifuge power supply 32 to shut off centrifuge motor 14. Alternatively, controller 82 may direct centrifuge power supply 32 to reduce the rotational speed on centrifuge motor 14.

A sensitivity control 86 may also be provided and is respectively coupled to accelerometer 76, filter 78, and controller 82 via connections 88, 90, and 92. Sensitivity control 86 may contain filters, such as low pass filters, high pass filters, and band pass filters which may be adjustable so that particular vibration frequencies whose induced acceleration accelerometer 76 detects can be adjusted and tuned. This allows for compensation due to production tolerances and also allows the system to be used on different centrifuge systems having different rotor and centrifuge motor configurations. One skilled in the art will appreciate that the filtering provided by sensitivity control 86 may be in addition to or instead of the filtering provided by filter 78. Sensitivity control 86 may also be used to provide the reference signal to controller 82 as well as providing a tolerance band, such as a range of voltage or current around the point at which controller 82 would provide the control signal.

The displacement signal is a voltage or current that is proportional to the displacement of the motor/rotor/mounting system.

Figure 4:
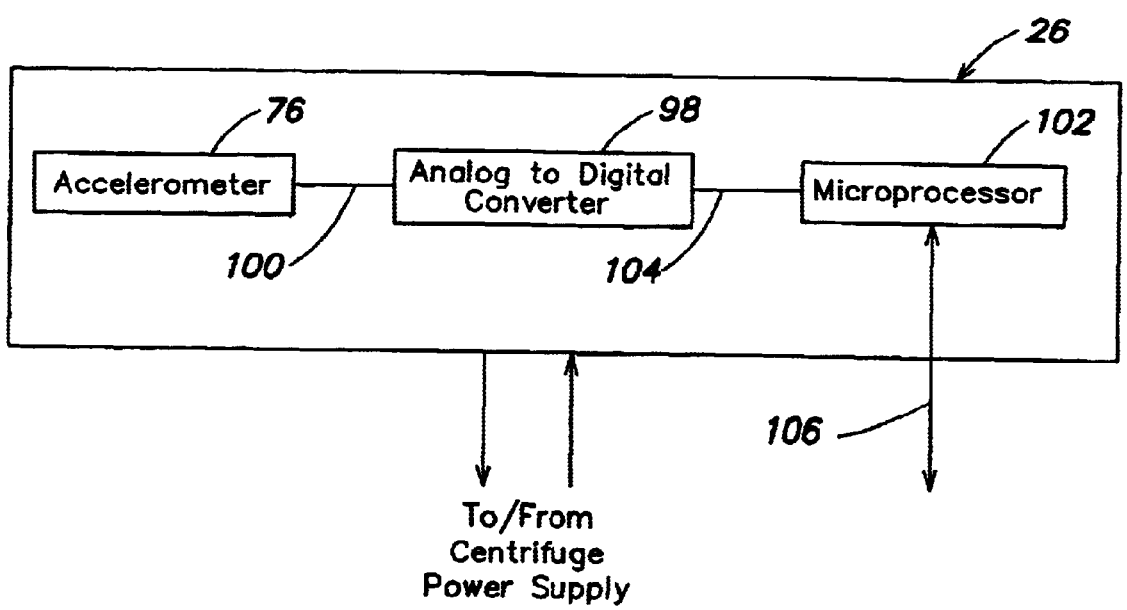
FIG. 4 illustrates a microprocessor based implementation of an imbalance detection system that may be used in the centrifuge system of FIG. 1.

Reference is now made to FIG. 4, which figure illustrates another embodiment of the imbalance detection system according to the invention. In FIG. 4, imbalance detection system 26 includes accelerometer 76 that provides the acceleration signal to an analog-to-digital converter 98 via connection 100. Analog-to-digital converter 98 provides a digitized representation of the acceleration signal to a microprocessor 102 via connection 104. Output signals from microprocessor 102, as well as inputs from other parts of centrifuge system 10 are provided to microprocessor 102 via connection 106.

The number of bits that analog-to-digital converter 98 converts the acceleration signal into may be selected depending upon the particular application the precision required.

Microprocessor 102 may be any one of a number of commercially available microprocessors or digital signal processors.

The imbalance detection system illustrated in FIG. 4 is programmable and is controlled by software executing on microprocessor 102. Microprocessor 102 can monitor the signal provided by analog-to-digital converter 98 and provide control signals to the rest of centrifuge system 10 in accordance with its programming. One advantage of the embodiment illustrated in FIG. 4 is that the system is programmable and can therefore be tailored for use on different centrifuge systems that may have different operating characteristics. In addition, highly accurate digital filtering can be implemented in the microprocessor software and can be used to provide a tolerance band around the signal level at which microprocessor 102 would provide the control signal to the centrifuge system. The use of digital filtering allows the imbalance detection system to be programmed to be sensitive to different vibration frequencies. The imbalance detection of FIG. 4 can also be used to monitor other parameters in addition to imbalance induced acceleration such as, for example, motor bearings, loose mountings, etc. simply by choosing appropriate filtering of the acceleration signal (to select the frequencies of interest) provided by accelerometer 76. Thus, the system of FIG. 4 can monitor and process multiple signals simultaneously.

Figure 5:
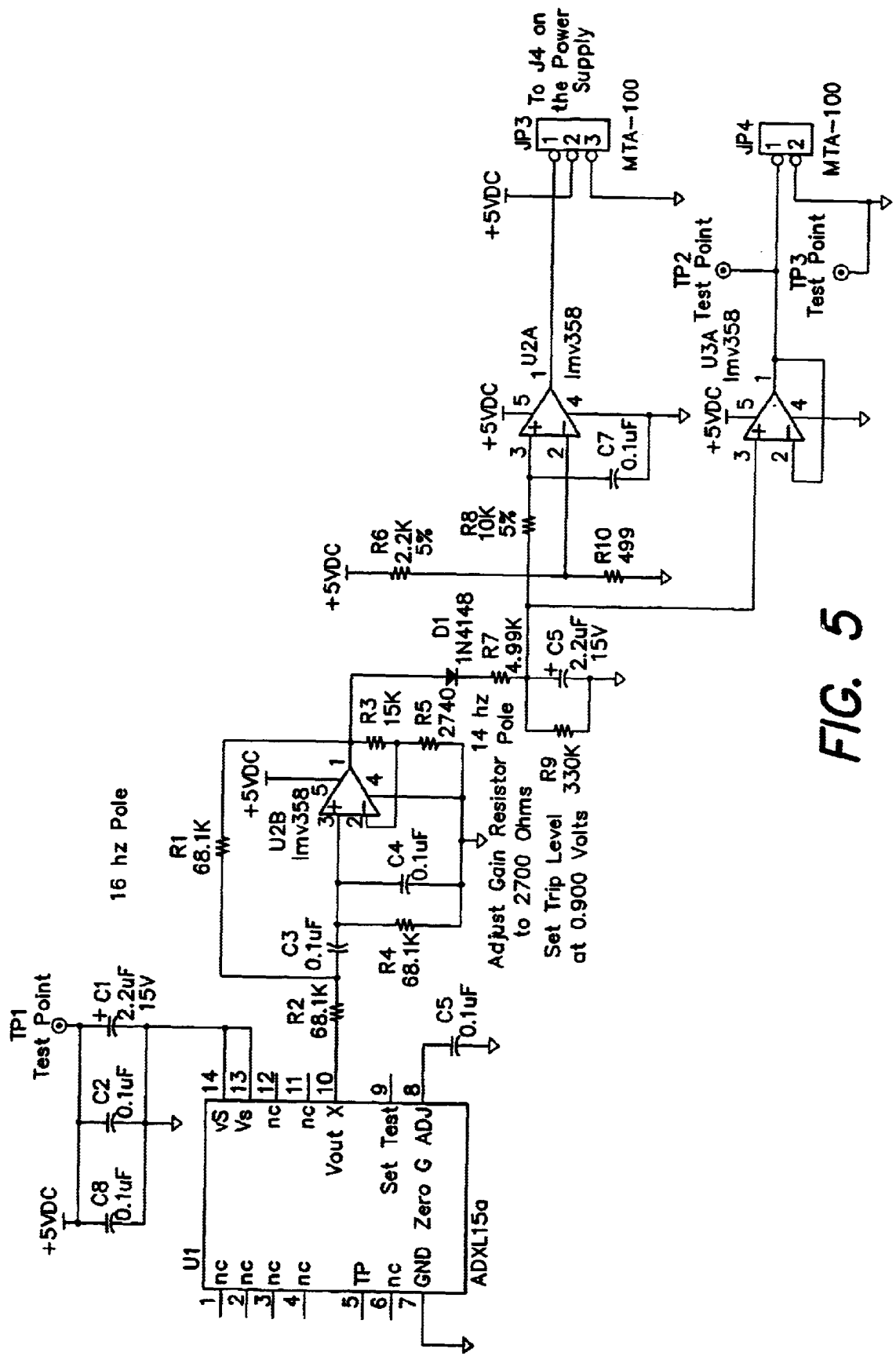
FIG. 5 is a detailed schematic diagram illustrating one embodiment of the imbalance detection system that may be used in the centrifuge system of FIG. 1.
Figure 6A:
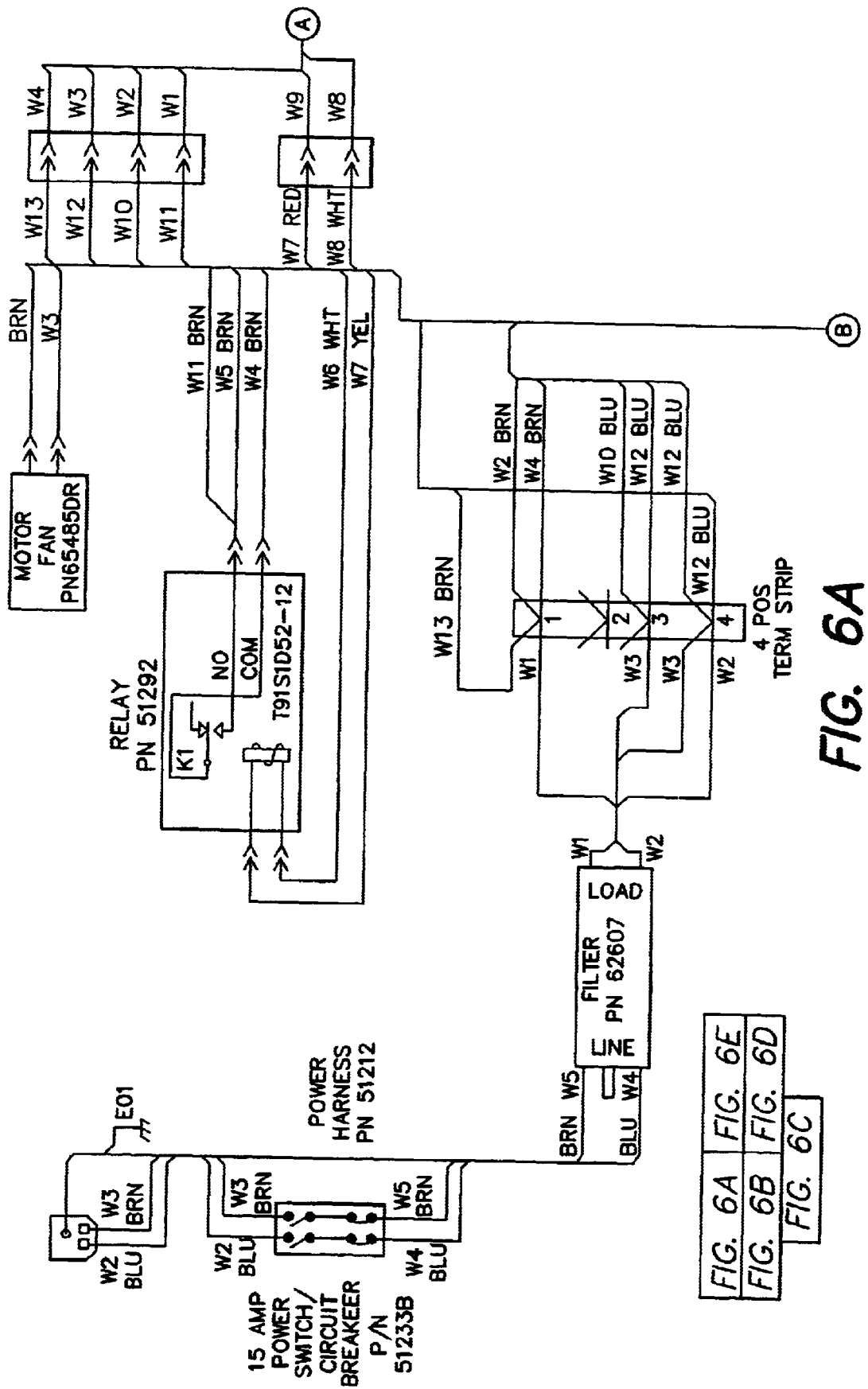
FIGS. 6A-E are interconnection schematic for the electrical system of a centrifuge system, such as the centrifuge system of FIG. 1, incorporating the present invention.
Figure 6B:
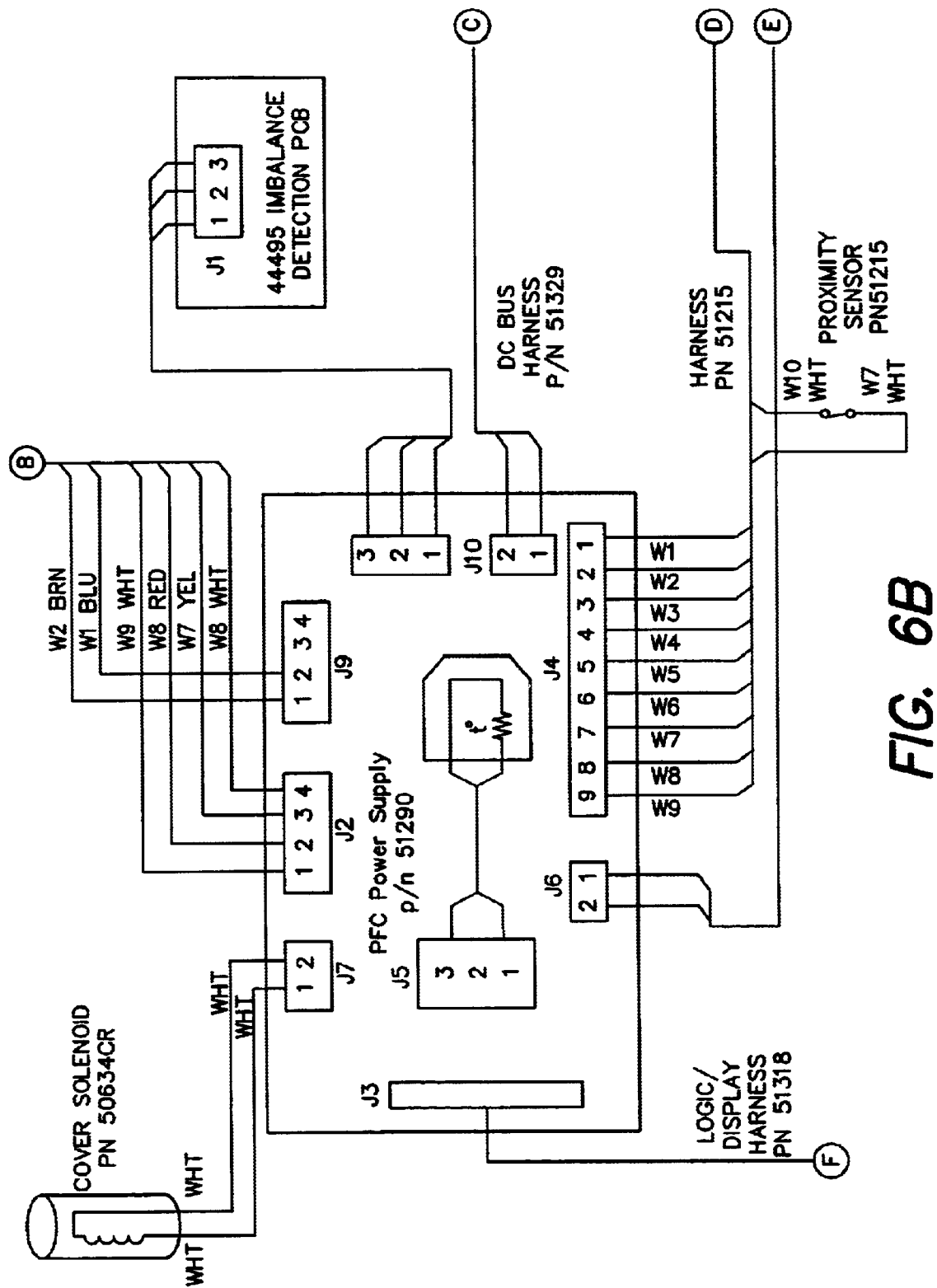
Figure 6C:
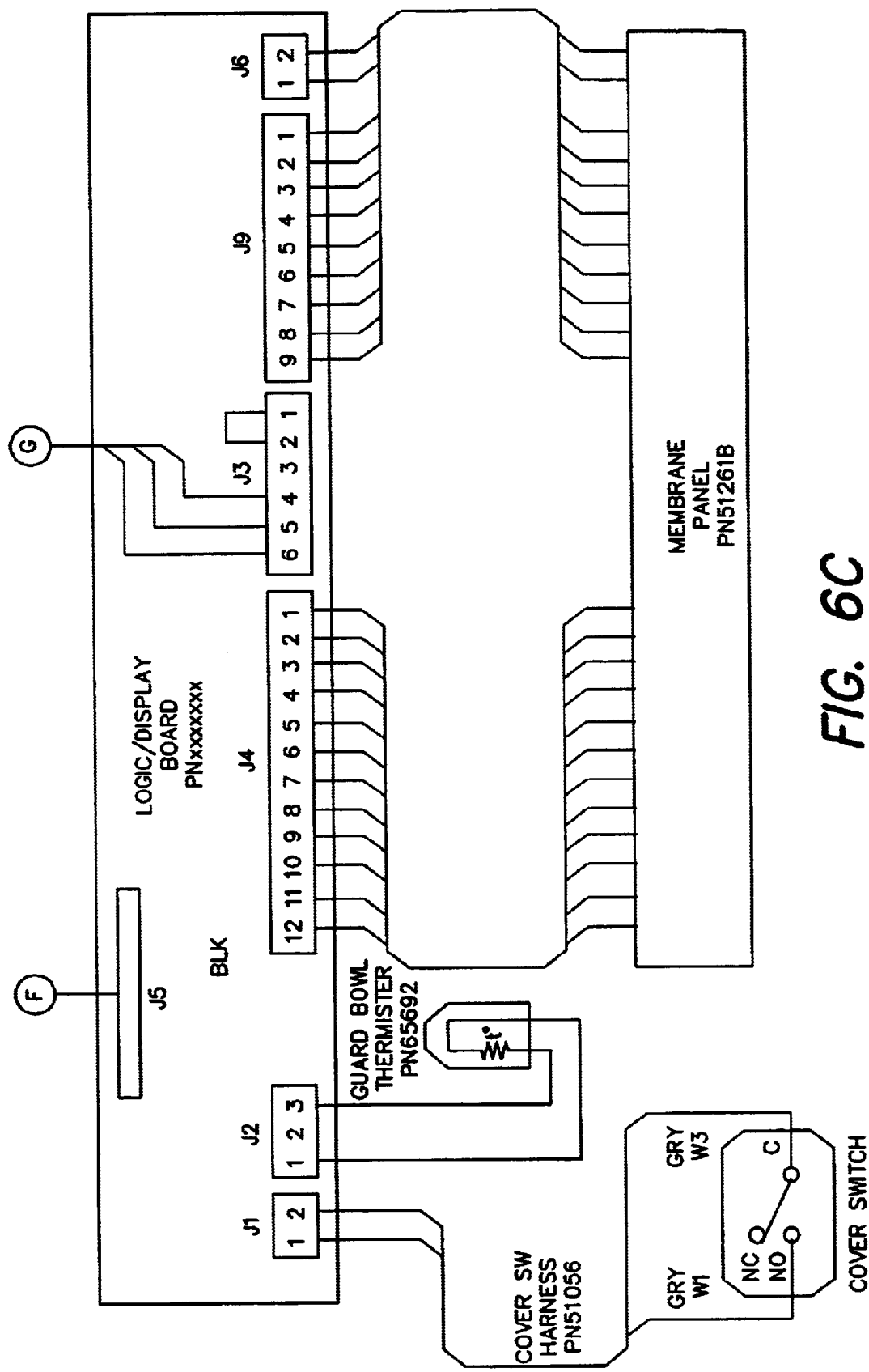
Figure 6D:
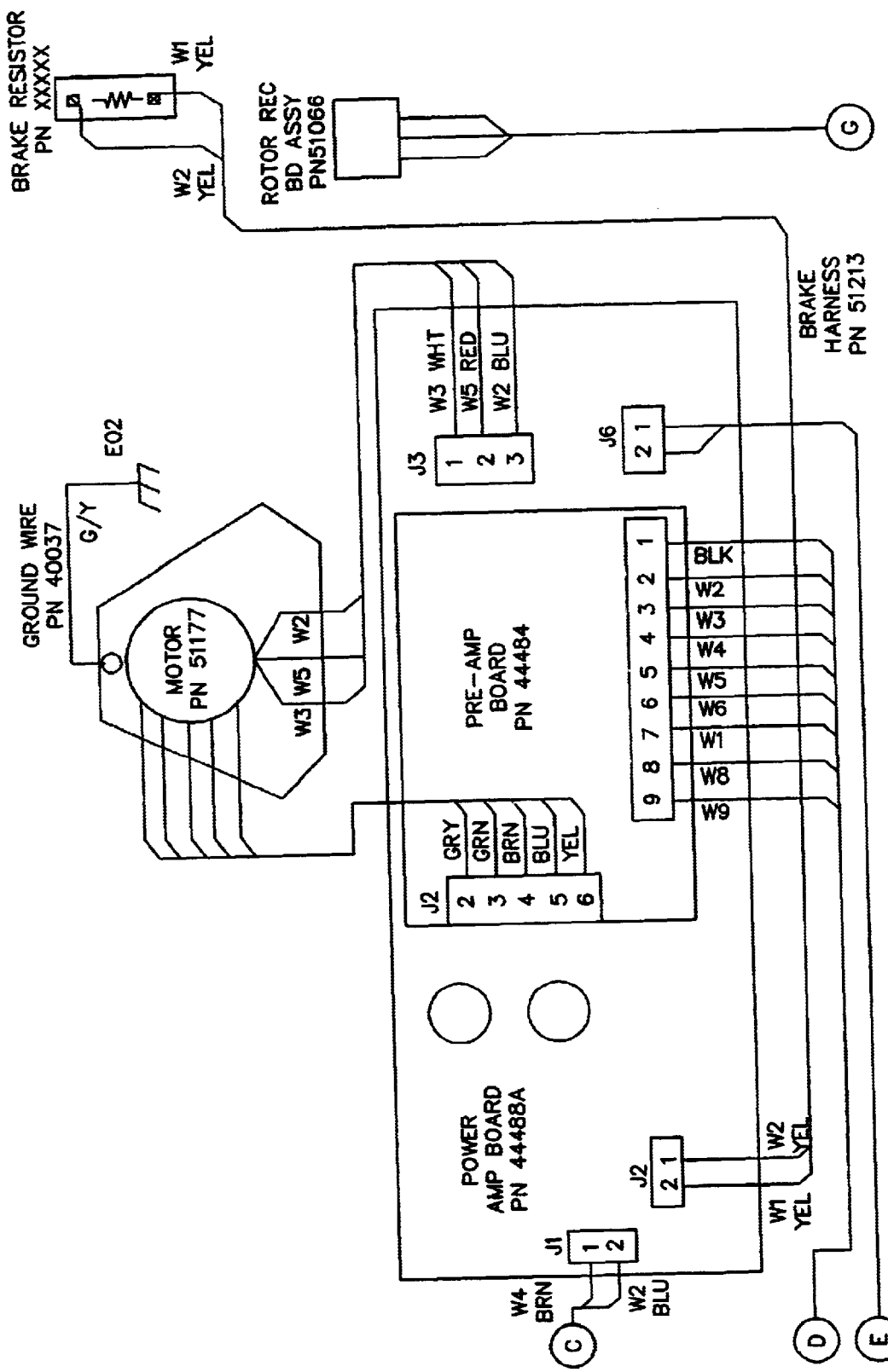
Figure 6E:
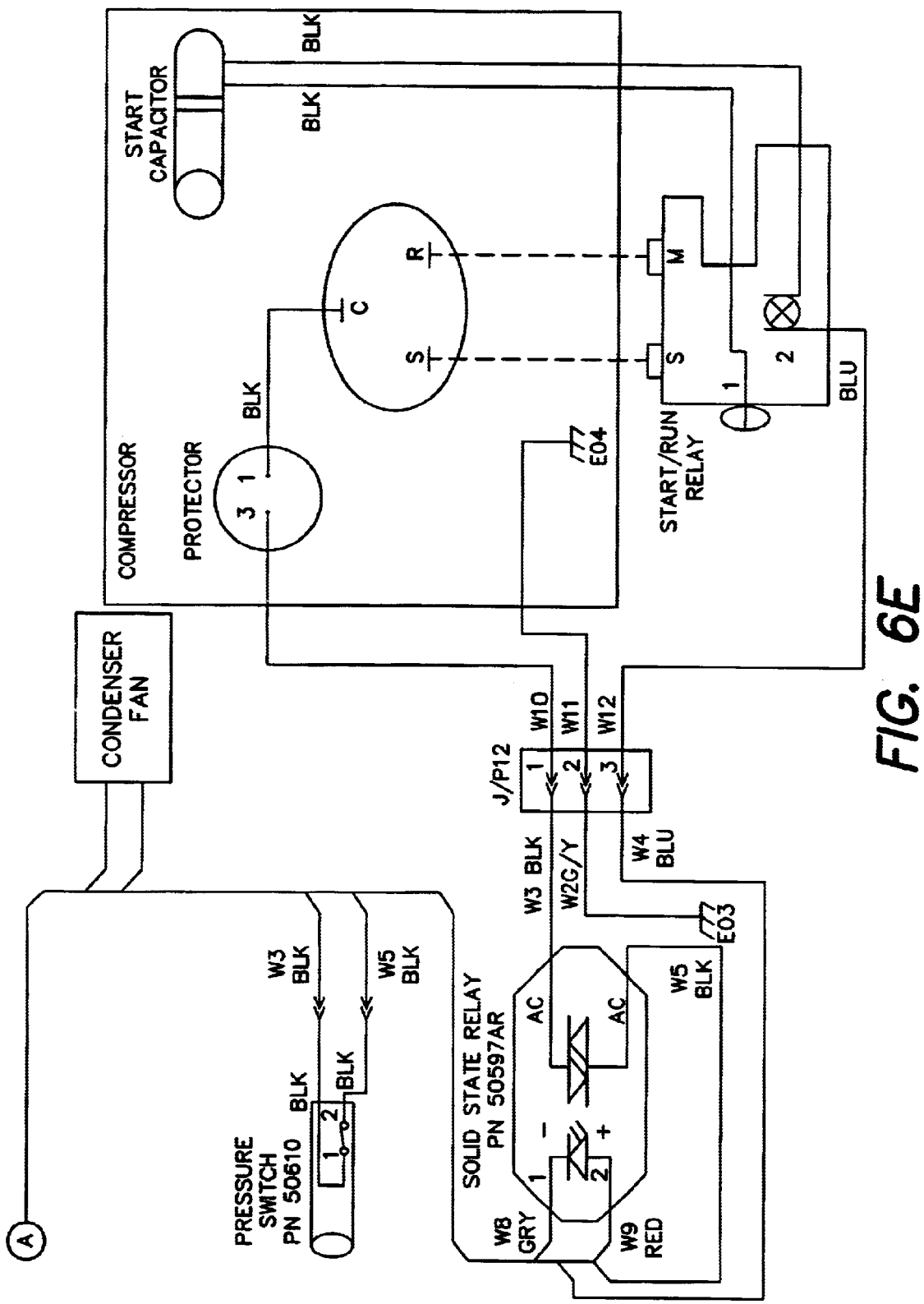

FIG. 5 is a detailed schematic diagram illustrating one embodiment of the imbalance detection system that may be used in the centrifuge system of FIG. 1.

FIGS. 6A-E are interconnection schematic for the electrical system of a centrifuge system, such as the centrifuge system of FIG. 1, incorporating the present invention.

One advantage of the invention is that it eliminates the need for manual adjustments because the integrated circuit accelerometer only needs to be mounted to the motor/rotor/mounting system in a way that it will sense displacement and does not require that the accelerometer be in proximity to any other particular component. In addition, because the electrical components used have 1 to 10 percent tolerances, no mechanical adjustment is required, and thus a time consuming step in production is eliminated.

The invention has been particularly illustrated with the imbalance detection system mounted to the rotor/motor/mounting system. Alternatively, imbalance detection system 26 could be mounted anywhere in or on centrifuge system 10 as long as it senses vibrations when centrifuge motor 14 and rotor 12 are spinning. Thus, for manufacturing purposes, to avoid having to provide an additional circuit board, the imbalance detection system could be provided as part of power supply 32, control panel 62, etc. The only adjustment that is required is to adjust the sensitivity of the frequencies or magnitudes so that these signals reflect the vibrations of interest at the particular location within centrifuge system 10. In the embodiment illustrated in FIG. 2, this can be accomplished by adjusting or providing different filters in sensitivity control 86. In the embodiment illustrated in FIG. 4, this can be provided by using different digital filtering techniques in the software executing on microprocessor 102.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An apparatus for controlling a centrifuge system, the centrifuge system including a rotor and a motor operatively coupled to the rotor, the apparatus comprising:

an accelerometer coupled to the centrifuge system so as to measure an acceleration of at least a portion of the centrifuge system during operation of the centrifuge system to provide an acceleration signal;

an integrator that receives the acceleration signal and integrates the acceleration signal to provide a displacement signal that represents a displacement of at least one of the motor and the rotor of the centrifuge system; and a controller that receives the displacement signal and controls the centrifuge system in response to the displacement signal.

2. The apparatus of claim 1, wherein the controller receives the acceleration signal and compares the acceleration signal with a reference signal and provides a control signal when a magnitude of the acceleration signal is larger than a magnitude of the reference signal.

3. The apparatus of claim 2, wherein the centrifuge system is shut down in response to the control signal.

4. The apparatus of claim 2, wherein a rotational speed of the rotor is reduced in response to the control signal.

5. The apparatus of claim 2, wherein the acceleration signal is a voltage.

6. The apparatus of claim 2, wherein the acceleration signal is a current.

7. The apparatus of claim 1, wherein the acceleration is in a radial direction, perpendicular to an axis of rotation of rotor.

8. The apparatus of claim 1, wherein the acceleration is in a longitudinal direction, along an axis of rotation of the rotor.

9. The apparatus of claim 1, wherein the acceleration is in a direction generally perpendicular to an axis of rotation of the motor.

10. The apparatus of claim 1, wherein the acceleration is a result of an imbalance condition in the rotor.

11. The apparatus of claim 10, wherein the acceleration is caused by vibrations of the rotor having range of frequencies when the rotor is spinning and wherein the apparatus further comprises means for determining a range of frequencies that the accelerometer will sense.

12. The apparatus of claim 1, wherein the accelerometer is an integrated circuit.

13. The apparatus of claim 1, wherein the accelerometer is a monolithic integrated circuit.

14. The apparatus of claim 1, further comprising a filter that receives the acceleration signal from the accelerometer and provides a filtered acceleration signal to the controller.

15. The apparatus of claim 14, wherein the filter comprises a high-pass filter.

16. The apparatus of claim 14, wherein the filter comprises a bandpass filter.

17. The apparatus of claim 14, wherein the filter comprises a low-pass filter.

18. The apparatus of claim 1, wherein the integrator integrates the acceleration signal to provide a velocity signal and then integrates the velocity signal to provide the displacement signal.

19. The apparatus of claim 1, wherein the integrator includes an operational amplifier and a capacitor.

20. The apparatus of claim 1, wherein the displacement signal is a voltage.

21. The apparatus of claim 1, wherein the displacement signal is a current.

22. An apparatus for controlling a centrifuge system, the centrifuge system including a rotor and a motor operatively coupled to the rotor, the apparatus comprising:

means for measuring an acceleration of at least a portion of the centrifuge system during the operation of the centrifuge system to provide an acceleration signal;

a filter including an integrator that receives the acceleration signal and integrates the acceleration signal to provide a displacement signal that represents a displacement of at least one of the motor and the rotor of the centrifuge system; and means for controlling the centrifuge system in response to the displacement signal.

23. The apparatus of claim 22, wherein the filter includes means for providing a filtered acceleration signal to the means for controlling.

24. A method of controlling a centrifuge system, the centrifuge system including a rotor and a motor operatively coupled to the rotor, the method comprising the steps of:

measuring an acceleration of at least a portion of the centrifuge system during operation of the centrifuge system to provide an acceleration signal;

integrating the acceleration signal to provide a displacement signal that represents a displacement of at least one of the motor and the rotor of the centrifuge system; and controlling the centrifuge system in response to the displacement signal.

25. The method of claim 24, wherein the step of controlling the centrifuge system further comprises comparing the acceleration signal with a reference signal and providing a control signal when a magnitude of the acceleration signal is larger than a magnitude of the reference signal.

26. The method of claim 25, wherein the control signal shuts off the centrifuge system.

27. The method of claim 25, wherein the centrifuge system responds to the control signal to reduce a rotational speed of the rotor.

28. The method of claim 24, wherein the step of integrating further includes integrating the acceleration signal to provide a velocity signal and then integrating the velocity signal to provide the displacement signal.

29. The method of claim 26, wherein the acceleration is caused by vibrations of the rotor having a range of frequencies and wherein the method further comprises the step of determining a range of frequencies that will be sensed when measuring the acceleration.

30. The method of claim 29 wherein the step of determining a range of frequencies includes filtering the range of frequencies to provide a filtered acceleration signal.

31. The method of claim 30, wherein the step of filtering the range of frequencies includes high-pass filtering the range of frequencies.

32. The method of claim 30, wherein the step of filtering the range of frequencies including band-pass filtering the range of frequencies.

33. The method of claim 30, wherein the step of filtering the range of frequencies includes low-pass filtering the range of frequencies.

* * * * *